US009528549B2

(12) United States Patent  
Kikuchi (10) Patent No.: US 9,528,549 B2  
(45) Date of Patent: Dec. 27, 2016

(54) LINEAR MOTION GUIDE UNIT

(71) Applicant: NIPPON THOMPSON CO., LTD., Tokyo (JP)

(72) Inventor: Shunsuke Kikuchi, Gifu-ken (JP)

(73) Assignee: NIPPON THOMPSON CO., LTD., Tokyo (JP)

( * ) Notice: Subject to any disclaimer, the term of this patent is extended or adjusted under 35 U.S.C. 154(b) by 0 days.

(21) Appl. No.: 14/670,681

(22) Filed: Mar. 27, 2015

(65) Prior Publication Data

US 2015/0345554 A1 Dec. 3, 2015

(30) Foreign Application Priority Data

May 30, 2014 (JP) ................. 2014-112162

(51) Int. Cl.
*F16C 29/06* (2006.01)
*F16C 33/10* (2006.01)
*F16C 33/66* (2006.01)
*F16C 29/00* (2006.01)

(52) U.S. Cl.
CPC ......... *F16C 29/064* (2013.01); *F16C 29/0611* (2013.01); *F16C 33/6611* (2013.01); *F16C 33/6648* (2013.01); *F16C 29/005* (2013.01); *F16C 29/0609* (2013.01)

(58) Field of Classification Search
CPC ... F16C 29/06; F16C 29/0604; F16C 29/0609; F16C 29/0611; F16C 29/0635; F16C 29/0638; F16C 29/0652; F16C 29/0654; F16C 33/6611; F16C 33/6648

USPC .............................................. 384/13, 43, 45
See application file for complete search history.

(56) References Cited

U.S. PATENT DOCUMENTS

| 2003/0053724 A1* | 3/2003 | Matsui ............... F16C 29/0609 384/45 |
| 2006/0215943 A1* | 9/2006 | Agari ................. F16C 29/0611 384/13 |
| 2007/0025651 A1* | 2/2007 | Kakei .................... F16C 29/06 384/45 |
| 2007/0071372 A1* | 3/2007 | Kuwabara .......... F16C 29/0611 384/44 |

(Continued)

FOREIGN PATENT DOCUMENTS

| JP | 2001082469 A | 3/2001 |
| JP | 2007032724 A | 2/2007 |

(Continued)

*Primary Examiner* — Phillip A Johnson
(74) *Attorney, Agent, or Firm* — Browdy and Neimark, PLLC (57) ABSTRACT

A porous compact impregnated with lubricant fits into a lengthwise hole in the carriage to apply the lubricant around balls rolling through a return passage to realize maintenance-free lubrication. The carriage has a flat upper portion which has threaded holes lying midway between the widthwise opposed bulges to fasten counterparts to the carriage. The carriage has widthwise opposed corners where the flat upper portion merges the respective bulges. The corners each have therein a lengthwise hole in which the cylindrical porous compact impregnated with lubricant is inserted to extend across the overall length of corners. The bulges of the carriage have threaded holes which are used to fasten the end caps to the fore and aft ends of the carriage.

11 Claims, 9 Drawing Sheets

(56) References Cited

U.S. PATENT DOCUMENTS

| | | | |
|---|---|---|---|
| 2012/0051676 A1* | 3/2012 | Kondo | F16C 29/0611 384/43 |
| 2013/0044968 A1* | 2/2013 | Kondo | F16C 33/6648 384/43 |
| 2013/0108194 A1* | 5/2013 | Kikuchi | F16C 33/6648 384/13 |

FOREIGN PATENT DOCUMENTS

| | | |
|---|---|---|
| JP | 2013040674 A | 2/2013 |
| JP | 2013096431 A | 5/2013 |

* cited by examiner

LINEAR MOTION GUIDE UNIT

FIELD OF THE INVENTION

The present invention relates to a small linear motion guide unit comprised of an elongated guide rail and a slider that is allowed to move on the elongated guide rail relatively to the guide rail through a plurality of balls of rolling elements.

BACKGROUND OF THE INVENTION

Linear motion guide units have been extensively applied in recent years between two parts which slide relative to each other in a variety of industrial fields including semiconductor fabricating equipment, various inspection/assembling machines, machine tools, and so on. With the prior linear motion guide units, a carriage for a slider has lengthwise holes which have therein sleeves of porous compact impregnated with lubricant. The balls while rolling through return passages defined within the sleeves are applied with the lubricant, thereby realizing virtual maintenance-free operating conditions for lubrication.

In the commonly assigned Japanese senior Laid-Open Patent Application No. 2001-082 469, there is disclosed a linear motion guide unit in which a slider has a lengthwise through-hole to fit over a sleeve of porous compact of sintered resinous material impregnated with lubricant to provide a return passage. The lubricant is applied for a prolonged interval around the balls while rolling through the return passage. With the linear motion guide unit recited just above, a slider movable relative to a guide rail through more than one rolling elements such as balls has a lengthwise through-hole into which the sleeve of sintered resinous material of porous texture fits to define the return passage to allow the balls to roll through the inside the sintered resinous material. With the prior linear motion guide unit constructed as stated earlier, lubricant impregnated inside the porous texture of the sintered resinous material continues to be applied around the balls while running though the return passage. Thus, load-carrying races are lubricated through the balls, thereby improved in reliability and, therefore, the sliding resistance against the slider is reduced remarkably.

Figure 18:
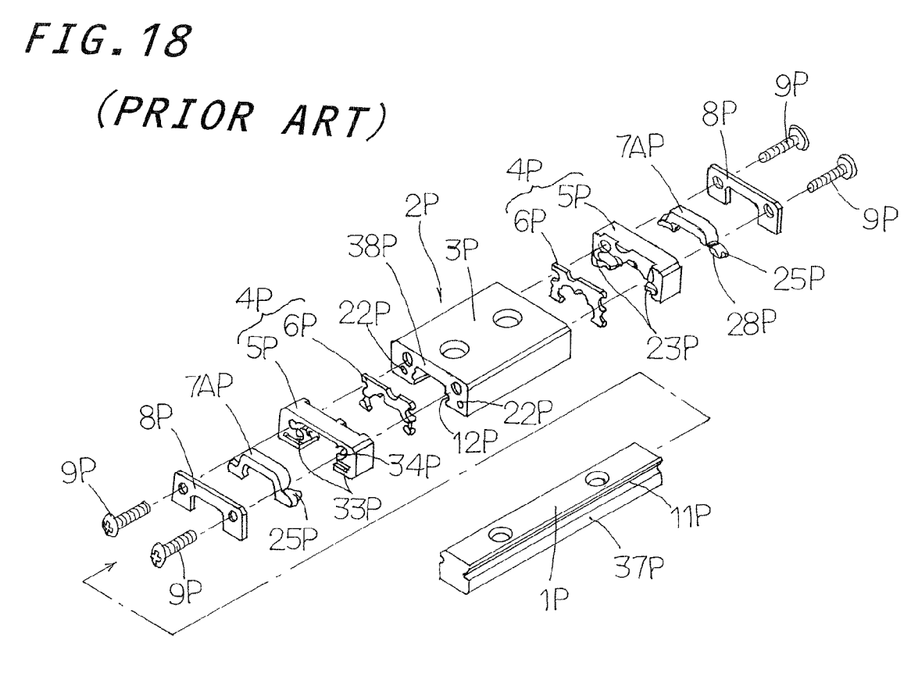
FIG. 18 is an exploited view in perspective showing the prior miniature linear motion guide unit.
Figure 19:
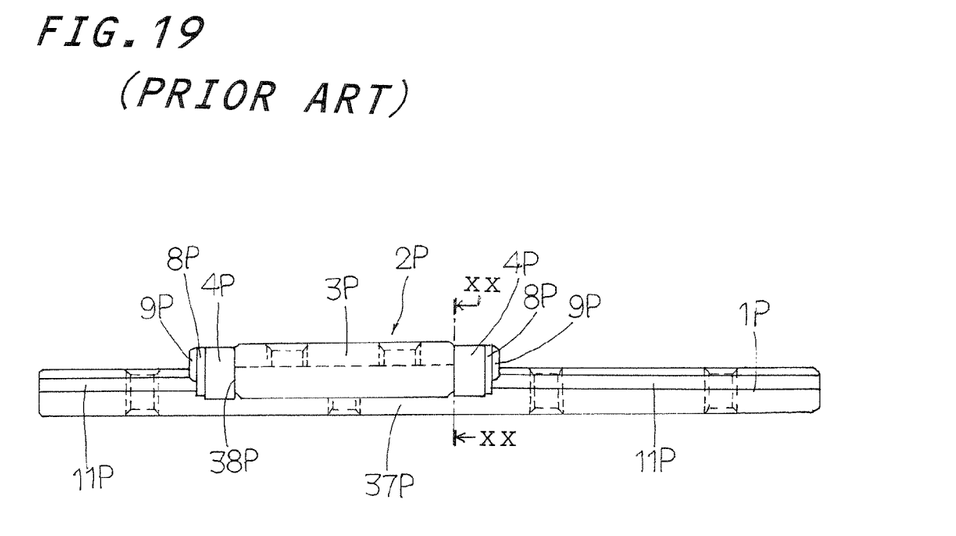
FIG. 19 is a view in side elevation of the prior miniature linear motion guide unit of FIG. 18.
Figure 20:
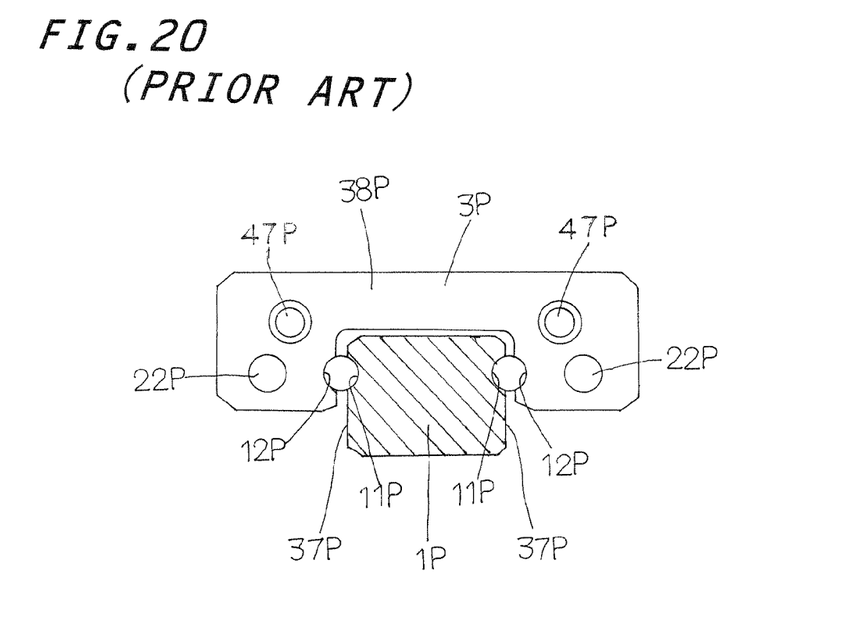
FIG. 20 is a view in front elevation of a carriage which fits over or conforms to a guide rail, the view being taken on the section plan of the line XX-XX of FIG. 19.

Another commonly assigned Japanese prior Laid-Open Patent Application No. 2013-096 431, discloses a linear motion guide unit in which a porous compact impregnated with lubricant is installed in an end cap in a way exposed to a turnaround passage in the end cap. The prior linear motion guide unit recited above, as shown in FIGS. 18 to 20, comprises a guide rail 1P having a raceway groove 11P extending lengthwise on each longitudinal side 37P of the guide rail, and a slider 2P which fits over or conforms to the guide rail 1P for movement relative to the guide rail. The slider 2P is composed of a carriage 3P having a pair of end caps 4P secured to opposite ends 38P of the carriage. The carriage has a raceway groove 12P lying in opposition to the raceway groove 11P of the guide rail to define a load-carrying race between opposed raceway groove 11P and raceway groove 12P. The carriage has a return passage 22P extending along the load-carrying race. The end caps 4P each have a turnaround passage to connect the load-carrying race and the return passage 22P. The slider 2P has a porous compact 7AP impregnated with lubricant to apply around balls rolling through a recirculating circuit which is made up of the load-carrying race, the return passage and the turnaround passages. Moreover, the slider has an end plate 8P to press the porous compact 7AP into a recess 34 in the end cap 4P. The end cap 4P is composed of an end cap major part 5P and a spacer part 6P. The end cap 4P together with the end plate 8P is secured to the carriage 3P by means of fastening screws 9P which have been driven into threaded holes 47P. With the prior linear motion guide unit constructed as recited earlier, the porous compact 7AP is installed exposed to the turnaround passage to make certainly steady application of lubricant around the balls while rolling through the turnaround passage, realizing a virtual maintenance-free operating condition for lubrication. With the linear motion guide unit constructed as stated earlier, the porous compact 7AP fits in the recess 34P in the end cap major part 5P and the end cap has a slit 33P cut in the outside circular wall surface 23P of the porous compact 7AP. An applicator nose 25P of the porous compact 7AP at a tip end 28P thereof is exposed into the turnaround passage through the slit 33P. The balls while rolling through the turnaround passage along slit edges are brought into rolling contact with the tip end 28P of the porous compact 7AP and coated with the lubricant held in the porous compact 7AP.

In another commonly assigned Japanese senior Laid-Open Patent Application No. 2007-032 724, there is disclosed a linear motion guide unit which is allowed to work with high-speed sliding operation and high tact for long service life with substantial maintenance-free for lubrication. This linear motion guide unit has a heavy load capacity even with its smaller size. To this end, return passages are made in a geometry lying obliquely upwards of load-carrying races. The return passages are apart and spaced away from their associated load-carrying races by a distance less or equal to twice a diametral dimension of a rolling element. End caps are integrally made with spigots, each of which is raised above a surface of the associated end cap facing on the carriage, thereby providing any one of forward and aft ends of the return passage. The spigots communicate with lubricant paths extending from lubricating ports made in the end caps.

In a further another commonly assigned Japanese senior Laid-Open Patent Application No. 2013-040 674, there is disclosed a miniature linear motion guide unit in which a tubular porous compact for a return passage is installed in an outward open recess cut in the carriage and a covering to bear the tubular member is integral with an end cap major part to make the slider compact and simple with cost saving in production. With the miniature linear motion guide unit constructed as stated earlier, the slider is composed of a carriage made up of an upper portion and side bulges extending downward and having the outward open recesses, end caps having turnaround passages, the tubular members lying on the outsides of the side bulges of the carriage, and coverings connected integrally with the end cap major parts to embrace the tubular members in combination with the outsides of the carriage. Lubricant is applied around the balls for rolling elements while the balls roll through the turnaround passages.

With the linear motion guide unit in which the sleeve is used for the return passage, however, as the carriage necessarily has the lengthwise bore larger in diameter than the return passage, the carriage is inevitably made smaller in thickness around the lengthwise bore. This causes a serious problem in mechanical strength of the carriage. To make the porous compact larger in volume, moreover, it is needed to make the end cap longer in the lengthwise direction of the slider. With the prior linear motion guide unit having no lubrication means, more especially a miniature version having the guide rail of around 3 mm in width, it is needed to supply lubricant at regular intervals to provide lubrication between the raceway grooves and the rolling elements, thereby protecting the direct contact of the raceway grooves with the rolling elements. With the prior miniature linear motion guide unit having the guide rail of around 3 mm in width and the sleeve of lubricating material, though it was basically preferable to keep the turnaround passage at the level equal with load-carrying races, the slider could not be made larger in width. In view of construction of the carriage, thus, there was no space on the carriage allowed for making the bore extend along the load-carrying race on the carriage. Moreover, with the miniature linear motion guide unit, the prior lubricant member could not be made large enough to hold ample lubricant therein, which created an issue giving rise to the shortage of lubricant in the endurance test.

With the prior linear motion guide unit, as the slider or the carriage of the slider usually is of a blocky contour having threaded holes lying spaced apart from each other on the widthwise middle zone of the slider, the sidewise opposed bulges of the carriage has spaces which afford to have lengthwise bores to stow the lengthwise sleeves therein, thereby providing the linear motion guide unit of sleeve type.

SUMMARY OF THE INVENTION

The present invention has as its principal object to overcome the major challenges as stated earlier in the miniature linear motion guide unit which has a guide rail of 3 mm in width, and the slider having a blocky contour of around rectangular shape in transverse section of 8 mm in width and 14.5 mm in length. More especially, the present invention is to provide the miniature linear motion guide unit in which the lengthwise bores are made in the carriage with no change in dimensions of various parts and/or components and the cylindrical porous compacts impregnated with lubricant fit into the lengthwise bores to provide the return passages. The miniature linear motion guide unit constructed as stated earlier is better for the realization of maintenance-free lubrication. The miniature linear motion guide unit constructed as stated earlier is better for the realization of maintenance-free lubrication and advantageous to make sure of the provision of the sufficient thickness for the carriage and the cylindrical sleeve of porous compact impregnated with lubricant. With miniature linear motion guide unit of the present invention, moreover, the carriage is allowed to have return passages which are arranged in the upper sides of the sidewise bulges of the carriage. In addition, the parts and/or components are color-coded from each other. For example, the spacer part for the end cap made in red may be assembled in the end cap major part body to expose the color from the upper and side of the end cap, thereby protecting the spacer part from being forgotten during assembly.

The present invention is concerned with a linear motion guide unit comprising: a guide rail having first raceway groove extending lengthwise on each longitudinal side of the guide rail, and a slider that fits over or conforms to the guide rail for movement relative to the guide rail, the slider being composed of a carriage having a second raceway groove lying in opposition to the first raceway groove of the guide rail to define a load-carrying race between the first raceway groove and the second raceway groove and a return passage extending in parallel with load-carrying race, an end cap secured to each opposite end of the carriage and each end cap comprising a turnaround passage to connect the load-carrying race with the return passage, and a plurality of rolling elements disposed to roll through a circulating circuit which is made up of the load-carrying race, return passages, and turnaround passages; wherein the carriage is made up of a flat upper portion spreading above and in opposition to a top surface of the guide rail and side bulges lying on widthwise opposite sides of the upper portion to extend downward alongside of the longitudinal sides of the guide rail and further having the second raceway grooves on inside surfaces thereof, and wherein the flat upper portion of the carriage has threaded holes lying midway between the widthwise opposed bulges to fasten counterparts to the carriage, the carriage having widthwise opposed corners where the flat upper portion merges the respective bulges, the corners each have therein a lengthwise hole in which a cylindrical porous compact impregnated with lubricant is snugly inserted to extend across a length of the corner, and the bulge of the carriage has threaded holes which are used to fasten the end caps to the fore and aft ends of the carriage.

According to the present invention, a linear motion guide unit is disclosed in which the end cap is composed of an end cap major part and a spacer, the end cap major part having sidewise opposed shoulders having surfaces to come into abutment against the bulges of the carriage, the shoulders each having a first spigot end cap major part having a first spigot part to constitute in part a cylindrical spigot which are to fit into a lengthwise hole in the carriage, the end cap major part further having an outside circular part of the turnaround passage continuing the first spigot part, and the spacer having a second spigot part coming into abutment against an end surface apart from the shoulders of the end cap major part to provide a rest of the spigots and formed with an inside circular wall of the turnaround passage.

According to the present invention, a linear motion guide unit is disclosed in which the end cap major part is composed of the shoulders, the upper portion extending between the shoulders and lying in opposition to the upper side of the guide rail, and bulges extending downwards from widthwise opposed ends of the upper portion along the longitudinal sides of the guide rail, and wherein the end surface of the upper portion that comes into abutment against the spacer has a lowered surface which is retracted backward with respect to the surfaces of the shoulders by a thickness of the spacer.

According to the present invention, a linear motion guide unit is disclosed in which a side surface to define the shoulder of the end cap major part provides a locating surface lying perpendicular to a sliding direction relative to the spacer when the spacer is arranged on the end surfaces of the upper portion and the bulges of the end cap major part. Moreover, the spacer, after being fastened across the overall length thereof to the end surface with the exception of sidewise opposed shoulders of the end cap major part, is exposed outside across the overall surfaces of the upper surface, side surface and bottom surface of the spacer. With the linear motion guide unit of the present invention, in addition, after the spacer was installed between the shoulders in a recessed surface below the shoulder, a cylindrical spigot of the first spigot part and the second spigot part mated with each other fits into the lengthwise hole in the carriage while the surfaces of the shoulders are formed flush with the end surface of the carriage.

According to the present invention, a linear motion guide unit is disclosed in which the first spigot on the end cap major part has about two-third circumference of the cylindrical spigot and the second spigot on the spacer has about one-third circumference of the cylindrical spigot. Moreover, a screw to fasten the end caps to the fore and aft ends of the carriage is driven into a counterbore lying on the outermost end surfaces of the end cap major part so as not to rise above the outermost surface of the end cap major part.

According to the present invention, a linear motion guide unit is disclosed in which the cylindrical porous compact is made of a fine powdery synthetic resinous material of polyethylene or polypropylene and is molded at an elevated temperature while being compacted into a porous or cellular structure in which the pores are open to each other through interstices among the fused particles. Lubricant is retained in the pores or cells in the porous structure and gets oozed out of the pores or cells by a stress or impact of the balls rolling through the return passages and is thus applied around the balls while rolling through the return passages.

According to the present invention, a linear motion guide unit is disclosed in which the carriage on one end thereof has a dent which is used to identify a direction while manufacturing the carriage and further the carriage, the end cap major part and the spacer are painted in different colors. Moreover, the linear motion guide unit is composed of the guide rail of around 3 mm in width and the slider of around 8 mm in width.

Effect of the Invention

The linear motion guide unit according to an embodiment of the invention is constructed as stated earlier, more particularly, the carriage has a flat upper portion which has threaded holes lying midway between the widthwise opposed bulges to fasten counterparts such as works and so on to the carriage. The carriage has widthwise opposed corners where the flat upper portion merges with the respective bulges. The corners each have therein a lengthwise hole in which the cylindrical porous compact impregnated with lubricant is inserted to extend across the overall length of corners. The bulges of the carriage have threaded holes which are used to fasten the end caps to the fore and aft ends of the carriage. In spite of the miniature version which has the guide rail of 3 mm in width and the slider having a blocky contour of around rectangular shape in transverse section of 8 mm in width, 14.5 mm in length and 4 mm in height, the linear motion guide unit of the present invention has the carriage made with the lengthwise hole to define the return passage into which the cylindrical porous compact impregnated with the lubricant fits to realize maintenance-free lubrication. Moreover, the end cap major part and the spacer are designed to make it easier to handle them to finish the miniature end cap. Since about two-third circumference of the cylindrical spigot on the end cap major part is able to guide the balls in a way such that the outside half-circular wall of the turnaround passage envelops or embraces the balls, the balls may transfer smoothly from the turnaround passage to the return passage of the porous compact. In the prior linear motion guide unit, for example, although the turnaround passage is preferably lying in the same horizontal level with the return passage, the horizontal arrangement of the turnaround passage as stated earlier is difficult because the thickness of porous compact and/or carriage is restricted in size or dimensions. To cope with this, the present invention proposes to dispose the return passages in the sidewise opposed upper corners of the carriage to overcome the restriction in size and dimensions in the carriage. Thus, the carriage is allowed to have the through holes larger in diameter as permitted, whereby the porous compact impregnated with an ample mount of lubricant may be used to realize the maintenance-free lubrication. With the linear motion guide unit constructed as stated earlier, the miniature parts are too small to recognize or distinguish them from each other. To cope with this, the present invention proposes to paint the carriage, end cap and spacer beforehand in different colors to identify in appearance the parts in the assembly phases. As a result, assembling of the parts may be protected from inadvertently leaving a necessary part behind.

DETAILED DESCRIPTION OF THE PREFERRED EMBODIMENTS

The linear motion guide unit according to the present invention is well adapted for use in any relative sliding components to make certain of smooth relative movement between parts or equipment in machinery as diverse as semiconductor manufacturing equipment, precision machinery, measurement/inspection instruments, medical instruments, various robots, various assembling machines, conveyers, machine tools, micromachines, and so on. The miniature linear motion guide unit of the present invention will be explained with reference to the accompanying drawings.

Figure 1:
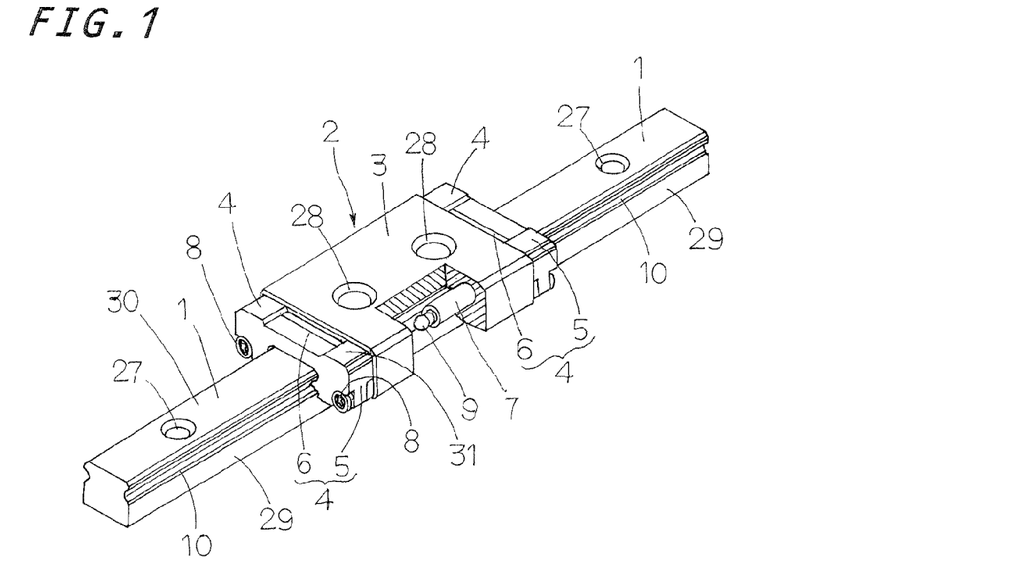
FIG. 1 is a partially cutaway view in perspective illustrating a preferred embodiment of a linear motion guide unit according to the present invention.
Figure 2:
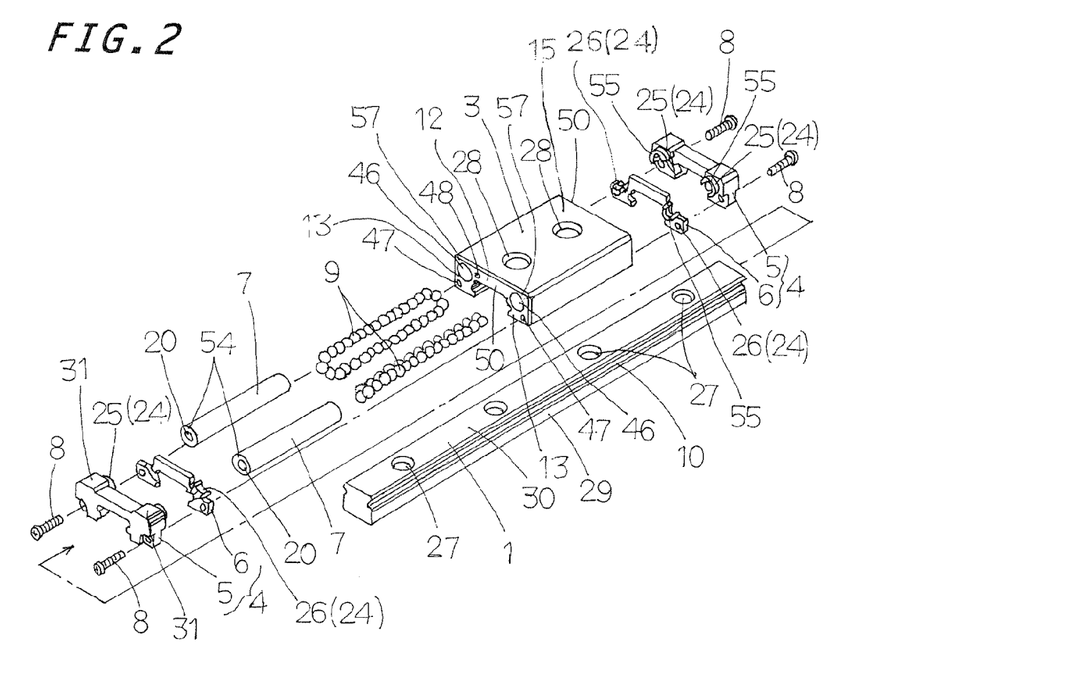
FIG. 2 is an exploded view in perspective of the miniature linear motion guide unit of FIG. 1
Figure 3:
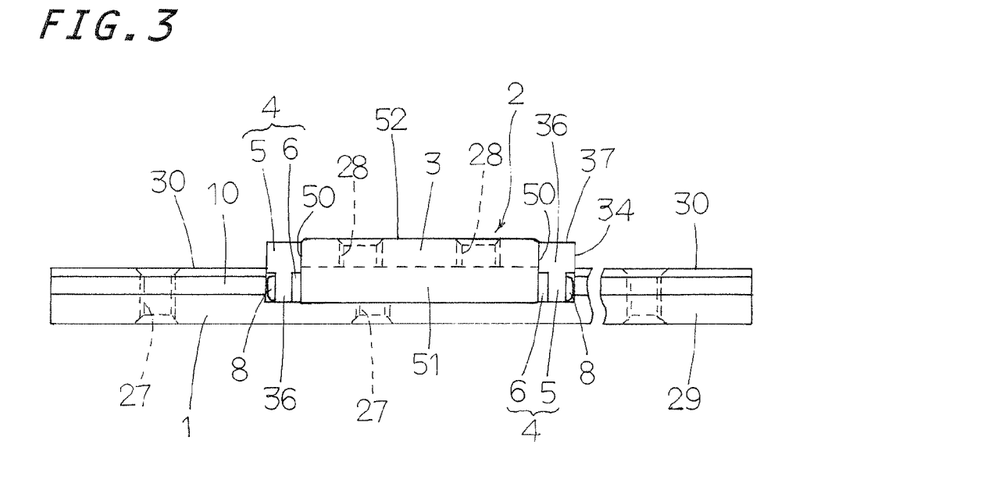
FIG. 3 is a view in side elevation of the miniature linear motion guide unit of FIG. 1.
Figure 4:
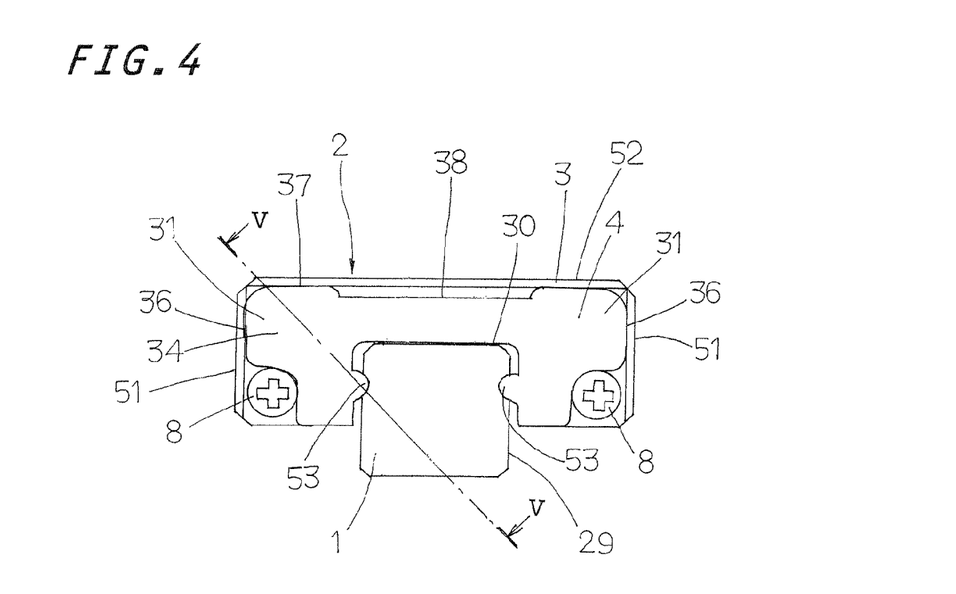
FIG. 4 is a view in front elevation showing the miniature linear motion guide unit of FIG. 1.
Figure 5:
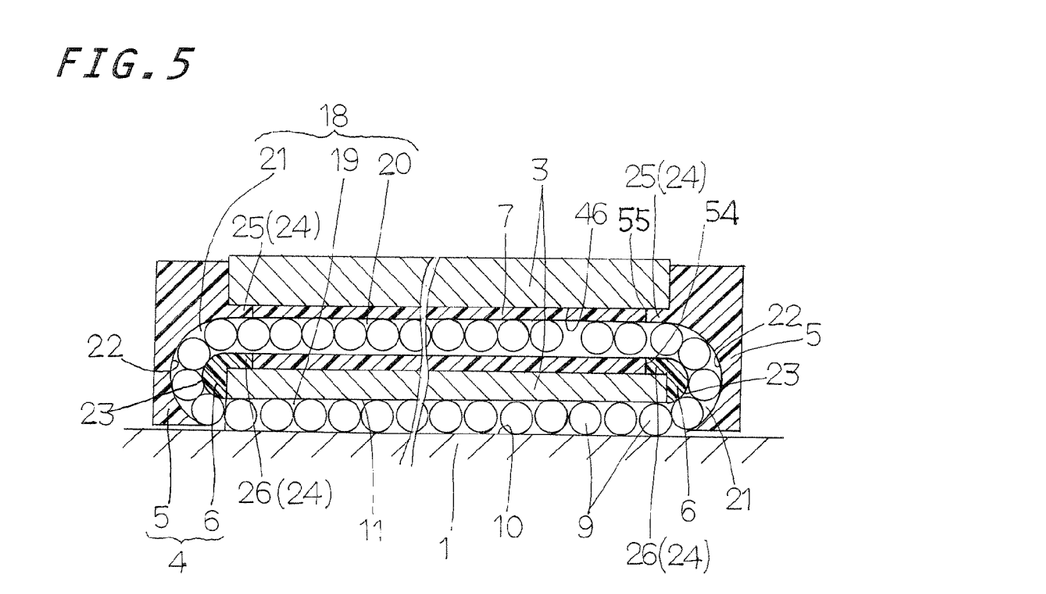
FIG. 5 is a view in section to illustrate a circulating circuit in the miniature linear motion guide unit of FIG. 4, the view being taken on the plane of the line V-V in FIG. 4.
Figure 6:
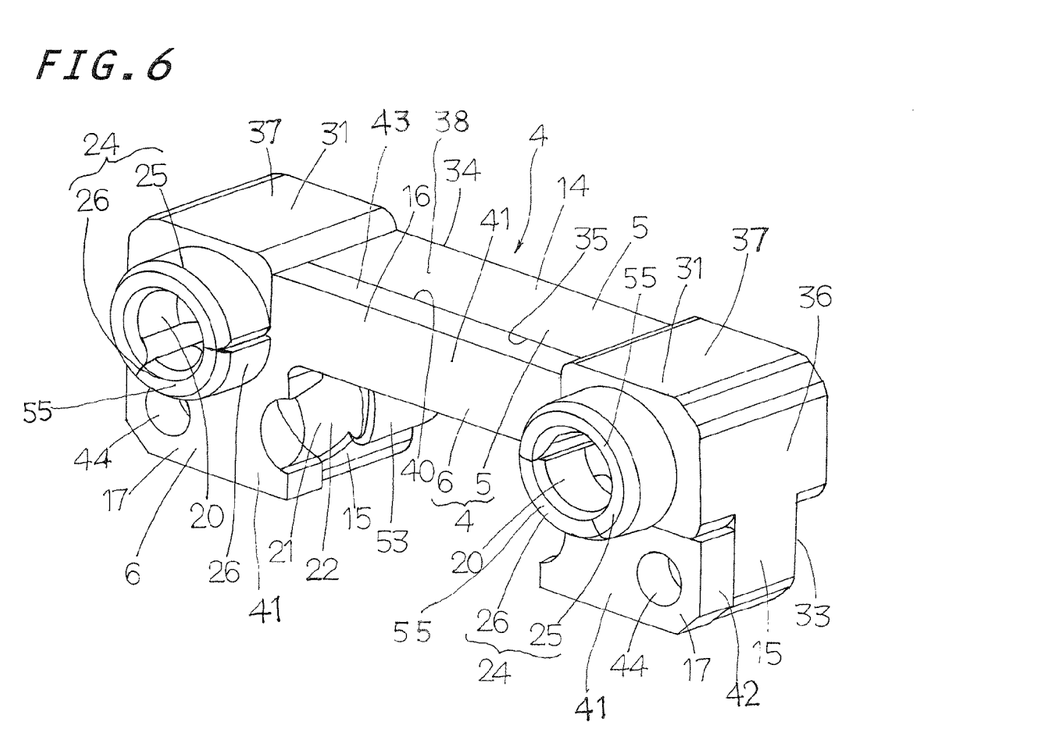
FIG. 6 is a view in perspective of an end cap in the miniature linear motion guide unit of FIG. 1.
Figure 7:
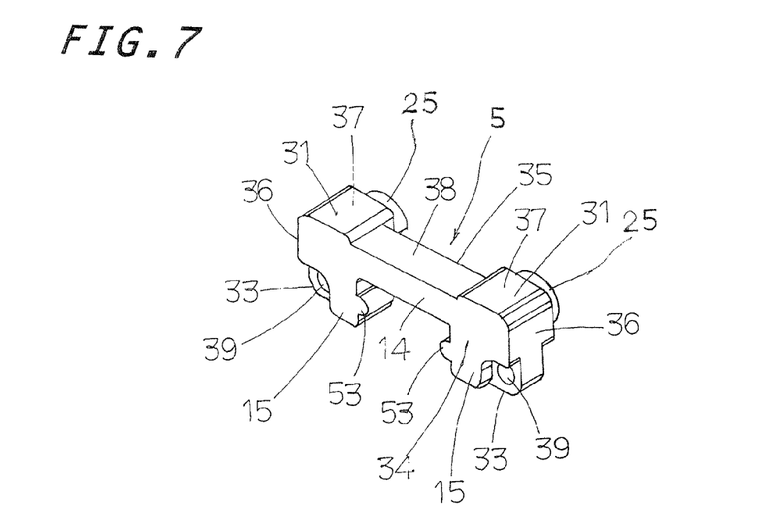
FIG. 7 is a view in perspective showing an end cap major part to constitute the end cap in the linear motion guide unit of FIG. 1.
Figure 8:
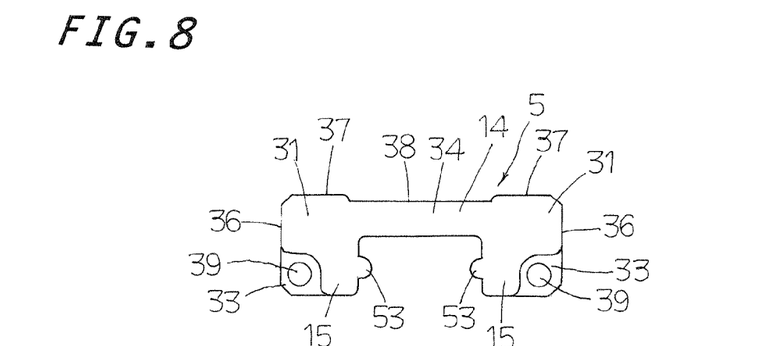
FIG. 8 is a view in front elevation of the end cap major part in FIG. 7.
Figure 9:
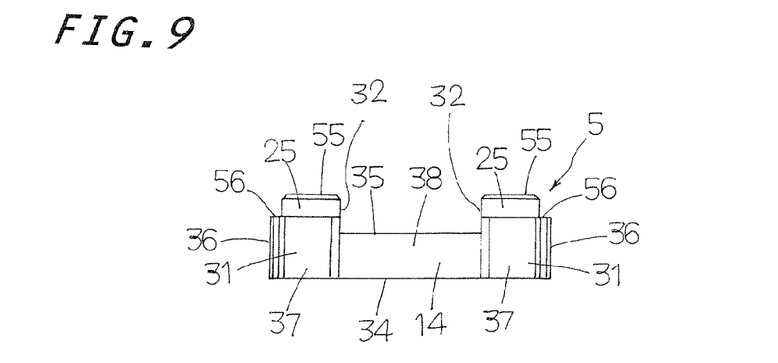
FIG. 9 is a view in plan showing the end cap major part of FIG. 7.
Figure 10:
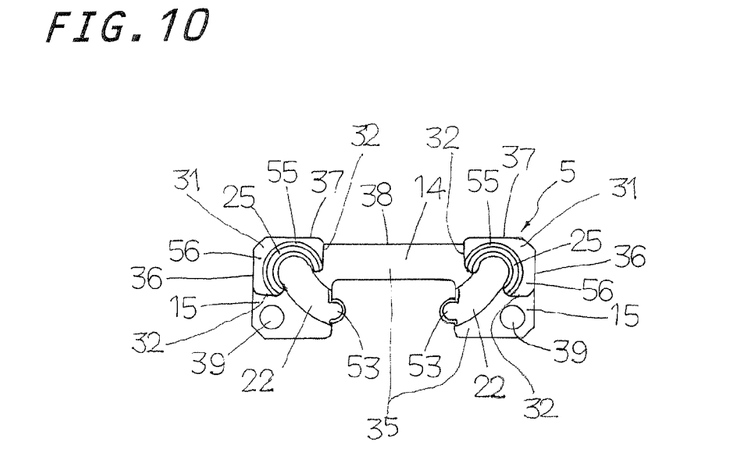
FIG. 10 is a view in rear elevation of the end cap major part of FIG. 7.
Figure 11:
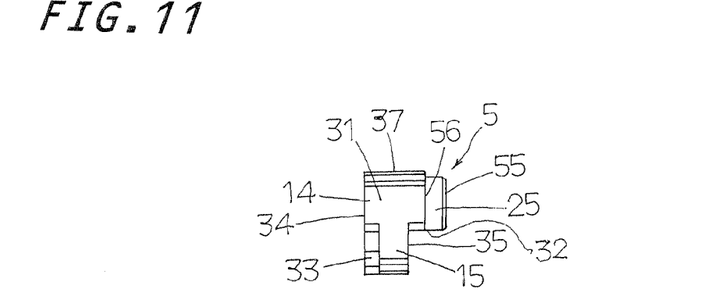
FIG. 11 is a view in side elevation of the end cap major part of FIG. 7.
Figure 12:
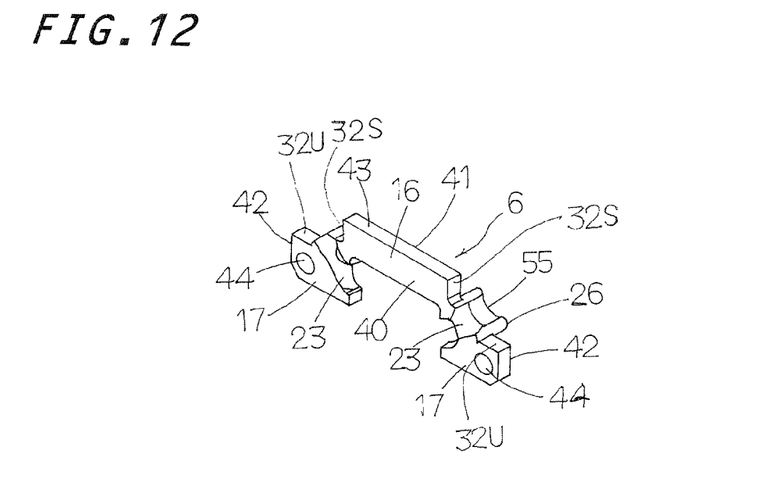
FIG. 12 is a view in perspective of the end cap major part to constitute the end cap in the linear motion guide unit of FIG. 1.
Figure 13:
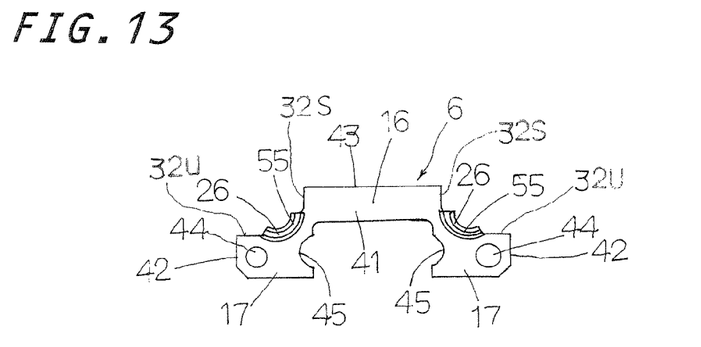
FIG. 13 is a view in rear elevation of the spacer part of FIG. 12, the view seen from the side of the carriage.
Figure 14:
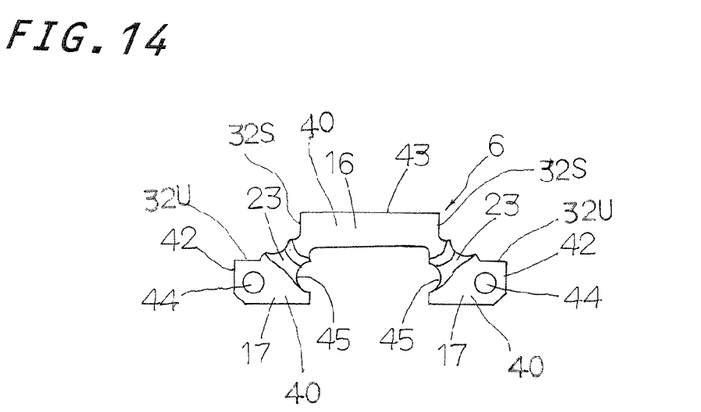
FIG. 14 is a view in front elevation of spacer part of FIG. 12.
Figure 15:
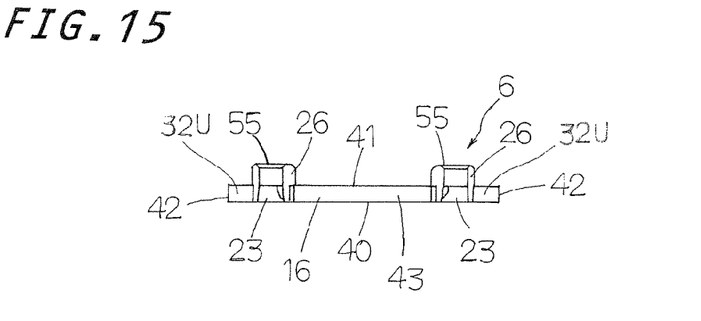
FIG. 15 is a view in plan showing the spacer of FIG. 12.
Figure 16:
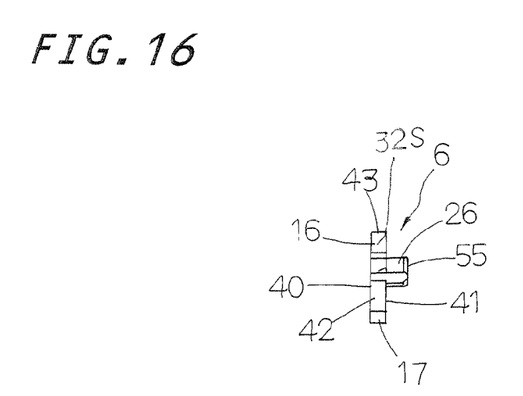
FIG. 16 is a view in side elevation of FIG. 12.

The linear motion guide unit of the present invention as shown in FIG. 1 is in general composed of an elongated guide rail 1 having one first raceway groove 10 extending lengthwise on each longitudinal side 29 that fits over or conforms to the guide rail 1 for movement relative to the guide rail 1 through more than one rolling elements of balls 9, and a slider 2 that fits over or conforms to the guide rail 1 for linear movement relatively to the guide rail 1. The guide rail 1 has holes 27 lying spaced away from each other at a regular interval and extending from an upper side 30 to a bottom side across a thickness of the guide rail 1. The slider 2 has a carriage 3 on fore and aft ends 50 on which are attached end caps 4. The carriage 3 has a second raceway groove 11 lying in opposition to the first groove 10 to define a load-carrying race 19 between the opposed first raceway groove 10 and second raceway groove 11, and a return passage 20 extending in parallel with the load-carrying race 19. The end caps 4 each have a turnaround passage 21 to connect each respective load-carrying race 19 and each respective return passage 20 to make a circulating circuit 18 which is made up of the load-carrying race 19, the return passage 20 and the end caps 4 opposed lengthwise across the carriage 3. More than one ball 9 is allowed to run through the circulating circuit 18. The carriage 3 is composed of a flat upper part 12 lying so as to straddle across an upper side 30 of the guide rail 1, and sidewise opposite bulges 13 extending downwards from sidewise opposed ends of the flat upper part 12 along the sides 29 of the guide rail 1. The second raceway groove 11 is made inside each respective bulge 13. The carriage 3 has a reference surface 49 on one of side surfaces 51 of the bulges 13, refer to FIG. 17. The raceway grooves 10 and 11 formed on the guide rail 1 and the slider 2 to provide two rows of the load-carrying race 19. The end cap 4 as shown especially in FIGS. 7 to 11 is composed of the end cap major part 5 and the spacer part 6. The end cap major part 5 has an outside half-circular wall 22 of the turnaround passage 21 on a surface facing toward the carriage 3. The spacer part 6 has an inside half-circular wall 23 of the turnaround passage 21 on a surface lying remote from the carriage 3. The spacer part 6 is designed to fit over an undercut end surface 35 of the end cap major part 5. To this end, the end cap major part 5 is made lower to provide the undercut end surface 35 with the exception of sidewise opposed shoulders 31. The end cap major part 5 and the spacer part 6 are assembled together in opposed relation to complete the end cap 4, refer to FIG. 6. The spacer part 6 especially as shown in FIGS. 12 to 16 includes sidewise opposed lugs 17 to define the inside half-circular wall 23 of the turnaround passage 21 and an upper portion 16 to connect together the sidewise opposed lugs 17. The end cap major part 5 has the sidewise opposed shoulders 31 raised towards the side of the carriage 3. The end cap major part 5 has a scooper portion 53 continuing to the turnaround passage 21. Moreover, an upper surface 37 of the end cap major part 5 is made lower to provide a recessed surface 38 below the shoulders 31 so as not to interfere with mounting any counterpart on the slider 2. Moreover, the spacer 6 is installed in such a relation that an end surface 40 (front side) of the spacer 6, lying in opposition to the carriage 3, is placed in abutment against an upper portion 14 undercut between the sidewise opposed shoulders 31 and the end surface 35 (rear side) of the spacer 6 depending downward from the upper portion 14. The turnaround passage 21 is completed with the outside half-circular wall 22 and the inside half-circular wall 23 which have mated with each other. Moreover, the inside circular surface 23 continues the raceway groove 11 through a cut portion 45.

Figure 17:
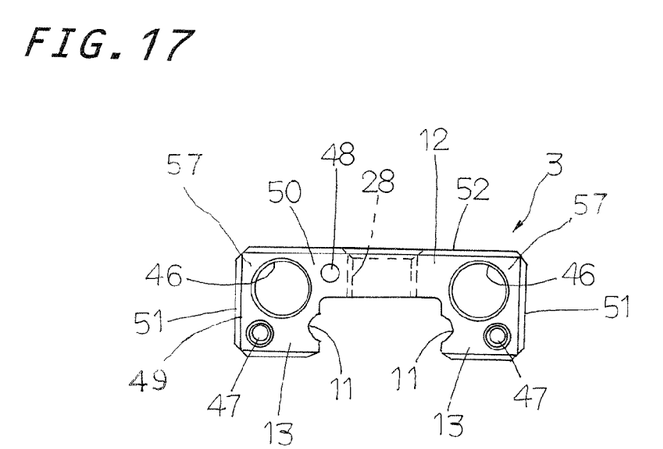
FIG. 17 is a view in front elevation of a carriage in the linear motion guide unit of FIG. 1.

With the linear motion guide unit of the present invention, especially, the carriage 3 has a flat upper portion 12 which has threaded holes 28 lying midway between the widthwise opposed bulges 13 to fasten counterparts such as works and so on to the carriage 3. Moreover, the carriage 3 has widthwise opposed corners 57 where the flat upper portion 12 merges with the respective bulges 13. The corners 57 each have therein a lengthwise hole 46 in which the cylindrical porous compact impregnated with lubricant is snugly inserted to extend across the overall length of corners 57. The bulges 13 of the carriage 3 as shown in FIG. 17 have threaded holes 47 which are used to fasten the end caps 4 to the fore and aft ends 50 of the carriage 3. With the linear motion guide unit constructed as stated earlier, more especially, the return passages 20 are arranged upwardly near to a top surface 52 of the carriage 3, and the threaded holes 47 used to fasten the end caps 4 to the carriage 3 are placed downwardly near to the bottom of the carriage 3. With the end cap 4 composed of the end cap major part 5 and the spacer part 6, more especially, the end cap major part 5 has first spigot parts 25 to constitute in part cylindrical spigots 24, which are to fit into the lengthwise holes 46 made in the carriage 3. The first spigot parts 25 are each raised above surfaces 56 which are to come into abutment against the bulges 13 of the carriage 3. The end cap major part 5, moreover, has the outside half-circular wall 22 of the turnaround passage 21 continuing to the first spigot parts 25. The spacer 6 has second spigot parts 26 and the inside half-circular wall 23 of the turnaround passage 21 continuing to the second spigot parts 26. The second spigot parts 26 recited above comes into abutment against the end surface 35 apart from the shoulders 31 of the end cap major part 5, thereby providing the rest of the spigots 24. The shoulders 31 on the end cap major part 5 are made in opposition to sidewise opposed corners 57 of the carriage 3 and brought into abutment against the sidewise opposed corners 57 of the carriage 3. The cylindrical spigot 24 of the end cap 4 at one lengthwise end 55 thereof comes into abutment against an end surface 54 of the cylindrical porous compact 7 which has fit into the lengthwise hole 46 in carriage 3, thereby fastening in location the cylindrical porous compact 7. The end cap major part 5 is composed of the widthwise opposed shoulders 31, the upper portion 14 extending between the shoulders 31 lying in opposition to the upper side 30 of the guide rail 1, and bulges 15 extending downwards from widthwise opposed ends of the upper portion 14 along the sides 29 of the guide rail 1. The end surface 35 of the upper portion 14 that comes into abutment against the spacer 6 is retracted backward with respect to the surfaces 56 of the shoulders 31 by a thickness of the spacer 6. With the linear motion guide unit of the present invention constructed as stated earlier, moreover, the end cap major part 5 has holes 39 while the spacer 6 has holes 44. These holes 39, 44 are made in correspondence with the holes 47 in the carriage 3. Thus, when the carriage 3 has been assembled with the end caps 4, the fastening screws 8, after being threaded through the holes 39, 44, are screwed into the threaded holes 47 in the carriage 3 to secure in place the end caps 4 against the carriage 3.

The end cap 4 is composed of the spacer 6 and the end cap major part 5. The spacer 6 has a rear end surface 41 coming into abutment against one of the fore and aft ends 50 of the carriage 3 which are attached end caps 4 with exception of the shoulders 31, and a front end surface 40 made with the inside half-circular wall 23 of the turnaround passage 21. The end cap major part 5 has the rear end surface 35 coming into abutment against the front end surface 40 of the spacer, and the outside half-circular wall 22 of the turnaround passage 21 in opposition to the inside half-circular wall 23 of the turnaround passage 21. The end cap major part 5, moreover, has end surfaces 56 on the back side of the shoulders 31 to come into abutment of the one of the fore and aft ends 50 of the carriage 3. On the rear end surface 41 of the end cap 4 in which the spacer 6 fits into the undercut end surface 35 lying between the shoulders 31 of the end cap major part 5, there is provided a pair of cylindrical spigots 24 which are raised above the front end surface 40 or the undercut end surface 35 to provide an end portion of the return passage 20, which fits into the lengthwise hole 46 of the carriage 3 in alignment with the cylindrical porous compact 7. On the rear end surface 40 of the spacer 6, a pair of second spigots 26 of about one-third circumference of the cylindrical spigot 24 are raised above the rear end surface 40 of the spacer 6 to communicate rises of the inside circular wall 23 of the turnaround passage 21. On the rear surfaces 56 of the shoulders 31 of the end cap major part 5, a pair of first spigot parts 25 of about two-third circumference of the cylindrical spigot 24 is raised above the rear end surface 40 of the spacer 6 to communicate rises of the outside circular wall 22 of the turnaround passage 21.

Moreover, side surfaces of the end cap major part 5 to define the shoulders 31 constitute locating surfaces 32 to locate the spacer 6 with respect to the end cap major part 5 when the spacer 6 is arranged relative to the upper portion 14 and the end surfaces 35 of the bulges 15. The spacer 6 is partly cut away in correspondence the shoulders 31 of the end cap major part 5. The spacer 6 has the second spigot parts 26 to rise above the surface thereof. The second spigot parts 26 are each flanked by a side surface 32S to locate the upper portion 16 and an upper surface 32U to locate the upper portion 16. With the linear motion guide unit constructed as stated earlier, after the spacer 6 was set between the bulges 15 in close engagement with the undercut end surface 35 of the end cap major part 5, abutments are made between the locating side surfaces 32 of the shoulders 31 and the locating side surfaces 32S and the locating upper surfaces 32U. Thus, the first spigot parts 25 of the end cap major part 5 is brought into aligned mating with the second spigots 26 of the spacer 6 to make the cylindrical spigot 24. As a result, the end cap 4 rich in high accuracy and reliability may be completed in which the spacer 6 is located in the plane in perpendicular to the sliding direction of the spacer 6 relatively to the end cap major part 5. More especially, after the upper surface 32U and the side surface 32S on the cut edge on the spacer 6 have come into abutment against the locating side surfaces 32 of the shoulders 31 on the end cap major part 5 to make the alignment of the first spigot parts 25 with the second spigot parts 26, the spacer 6 is located in the plane in perpendicular to the sliding direction of the spacer 6 relative to the end cap major part 5. Then, the cylindrical spigots 24 of the end cap 4 fit into the lengthwise holes 46 in the carriage 3 to arrange the end cap 4 on one of the aft ends 50 of the carriage 3, so that the end cap 4 is located on the carriage 3 in the plane in perpendicular to the sliding direction of the spacer 6. Thereafter, the fastening screws 8, after extending through the holes 39, 44, are driven into the threaded holes 47 in the carriage 3 to tighten the end cap 4 against the carriage 3 to fasten the end cap 4, thereby locating the end cap 4 relative to the carriage 3 in the sliding movement of the slider 2. With the end cap 4 constructed as stated earlier, because the spacer 6 is abutted or fastened across the overall length thereof to the undercut end surface 35 with the exception of sidewise opposed shoulders 31 of the end cap major part 5, the spacer 6 is exposed outside across the overall surfaces of upper surface 43, side surface 42 and bottom surface of the spacer 6. Accordingly, when the carriage 3, end cap 4 and spacer 6 of the slider 2 are beforehand painted in different colors, assembling phases may be identified by appearance and, therefore, assembling of the parts may be protected from leaving a necessary part behind.

After the first spigot parts 25 of the end cap major part 5 have come into line with the second spigot parts 26 of the spacer 6, the cylindrical spigots 23 are completed and further the surfaces 56 of the shoulders 31 are formed in flush with the end surface 50 of the carriage 3. After the cylindrical spigots 24 made up of the spigot parts 25 and the spigot parts 26 mated with each other have fit into the lengthwise holes 46 of the carriage 3, the locating side surfaces 32S of the upper portion 16 of the spacer 6 and the locating side surfaces 32U of the lugs 17 come into accurate alignment with the locating surfaces 32 lying on the sides of the shoulders 31 of the end cap major parts 5, whereby the spacer 6 is located and accurately secured to the end cap major part 5. With the linear motion guide unit constructed as stated earlier, the first spigot parts 25 on the end cap major part 5 each form about two-third circumference of the cylindrical spigot 24, while the second spigot parts 26 on the spacer 6 each form about one-third circumference of the cylindrical spigot 24. Moreover, the fastening screws 8 to fasten the end caps 4 to the fore and aft ends 50 of the carriage 3 are driven into recesses 33 made on an outermost surfaces 35 of the end cap major parts 5 so as not to rise above an outermost surface 34 of the end cap major part 5.

Moreover, the cylindrical porous compact 7 to fit into the lengthwise hole in the carriage 3 is made of, for example, a fine powdery synthetic resinous material of polyethylene or polypropylene which is molded at an elevated temperature while compacted into a porous or cellular structure in which the pores are open to each other through interstices among the fused particles. Lubricant retained in the pores or cells in the porous structure gets oozed out of pores or cells by a stress or impact of the balls rolling through the return passages 20 and applied around the balls 9 while rolling through the return passages 20 to make lubrication for the balls 9 rolling through the load-carrying races 19. With the linear motion guide unit of the present invention, moreover, the carriage 3 on one end 50 thereof has a dent 48 which is used to identify the direction while manufacturing the carriage 3. With the slider 2 in which the spacer 6 is nested in the end cap major part 5, the spacer 6 is exposed outside from the end cap major part 5 across the overall surfaces of the upper surface 43 lying midway between the upper surfaces 37, side surfaces 42 lying below side surfaces 36 and a bottom surface of the spacer 6. With the linear motion guide unit constructed as stated earlier, accordingly, the carriage 3, end cap major part 5 and spacer 6 are beforehand painted in different colors, for example, such as where the end cap major part 5 is colored in blue and the spacer 6 is colored in red, parts to be assembled may be identified at a glance and, therefore, assembling of the parts may be protected from leaving a necessary part behind. Moreover, the linear motion guide unit of the present invention is a miniature style composed of, for example the guide rail 1 of around 3 mm in width and the slider 2 of around 8 mm in width.

What is claimed is:
1. A linear motion guide unit comprising: a guide rail having first raceway groove extending lengthwise on each longitudinal side of the guide rail, and a slider that fits over or conforms to the guide rail for movement relative to the guide rail, the slider being composed of a carriage having a second raceway groove lying in opposition to the first raceway groove on each longitudinal side of the guide rail to define a load-carrying race between the first raceway groove and the second raceway groove and a return passage extending in parallel with load-carrying race, an end cap secured to each opposite end of the carriage and each end cap comprising a turnaround passage to connect the load-carrying race with the return passage, and a plurality of balls for rolling elements disposed to roll through a circulating circuit which is made up of the load-carrying race, return passages, and turnaround passages;

wherein the carriage is made up of a flat upper portion spreading above and in opposition to a top surface of the guide rail and side bulges lying on widthwise opposite sides of the upper portion to extend downward alongside of the longitudinal sides of the guide rail and further having the second raceway grooves on inside surfaces thereof, and wherein the flat upper portion of the carriage has threaded holes lying midway between the widthwise opposed bulges to fasten counterparts to the carriage, the carriage having widthwise opposed corners where the flat upper portion merges with the respective bulges, the corners each have therein a lengthwise hole in which a cylindrical porous compact impregnated with lubricant is inserted to extend across a length of the corner, and the bulges of the carriage have threaded holes which are used to fasten the end caps to the fore and aft ends of the carriage.

2. The linear motion guide unit constructed as defined in claim 1, wherein the end cap is composed of an end cap major part and a spacer, an end cap major part having sidewise opposed shoulders having surfaces to come into abutment against the bulges of the carriage, the shoulders each having a first spigot end cap major part having a first spigot part to constitute in part a cylindrical spigot which are to fit into a lengthwise hole in the carriage, the end cap major part further having an outside circular part of the turnaround passage continuing the first spigot part, and the spacer having a second spigot part coming into abutment against an end surface apart from the shoulders of the end cap major part to provide a rest of the spigots and formed with an inside circular wall of the turnaround passage.

3. The linear motion guide unit constructed as defined in claim 2, wherein the end cap major part is composed of the shoulders, the upper portion extending between the shoulders with lying in opposition to the upper side of the guide rail, and bulges extending downwards from widthwise opposed ends of the upper portion along the longitudinal sides of the guide rail, and wherein the end surface of the upper portion to come into abutment against the spacer has a lowered surface which is retracted backward than the surfaces of the shoulders by a thickness of the spacer.

4. The linear motion guide unit constructed as defined in claim 3, wherein a side surface to define the shoulder of the end cap major part provides a locating surface lying perpendicular to a sliding direction relative to the spacer when the spacer is arranged on the end surfaces of the upper portion and the bulges of the end cap major part.

5. The linear motion guide unit constructed as defined in claim 4, wherein after the spacer is installed between the shoulders in a recessed surface below the shoulder, the cylindrical spigot of the first spigot part and the second spigot part mated with each other fits into the lengthwise hole in the carriage while the surfaces of the shoulders are formed flush with the end surface of the carriage.

6. The linear motion guide unit constructed as defined in claim 5, wherein the spacer, after fastened across the overall length thereof to the end surface with the exception of sidewise opposed shoulders of the end cap major part, is exposed outside across the overall surfaces of upper surface, side surface and bottom surface of the spacer.

7. The linear motion guide unit constructed as defined in claim 2, wherein the first spigot on the end cap major part has about two-third circumference of the cylindrical spigot and the second spigot on the spacer has about one-third circumference of the cylindrical spigot.

8. The linear motion guide unit constructed as defined in claim 2, wherein a screw to fasten the end caps to the fore and aft ends of the carriage is driven into a counterbore lying on the outermost end surfaces of the end cap major part so as not to rise above the outermost surface of the end cap major part.

9. The linear motion guide unit constructed as defined in claim 2, wherein the carriage on one end thereof has a dent which is used to identify a direction while manufacturing the carriage and wherein the carriage, the end cap major part and the spacer are painted in different colors.

10. The linear motion guide unit constructed as defined in claim 1, wherein the cylindrical porous compact is made of a powdery synthetic resinous material of polyethylene or polypropylene which is molded at an elevated temperature while compacted into a porous or cellular structure in which the pores are open to each other through interstices among the fused particles, and lubricant retained in the pores or cells in the porous structure gets oozed out of pores or cells by a stress or impact of the plurality of balls rolling through the return passages and applied around the plurality of balls while rolling through the return passages.

11. The linear motion guide unit constructed as defined in claim 1, which is a miniature style composed of the guide rail of around 3 mm in width and the slider of around 8 mm in width.

* * * * *